(12) United States Patent
Butler

(10) Patent No.: US 10,504,394 B2
(45) Date of Patent: Dec. 10, 2019

(54) SMART PHONE FAN AND LED DISPLAY

(71) Applicant: The Original Selfie Fan Company, LLC, Lake Worth, FL (US)

(72) Inventor: Richard Butler, Lake Worth, FL (US)

(73) Assignee: The Original Selfie Fan Company, LLC, Lake Worth, FL (US)

( * ) Notice: Subject to any disclaimer, the term of this patent is extended or adjusted under 35 U.S.C. 154(b) by 48 days.

(21) Appl. No.: 15/495,211

(22) Filed: Apr. 24, 2017

(65) Prior Publication Data

US 2017/0229050 A1   Aug. 10, 2017

Related U.S. Application Data

(60) Provisional application No. 62/444,108, filed on Jan. 9, 2017.

(51) Int. Cl.
*G09G 3/00* (2006.01)
*H04M 1/02* (2006.01)

(52) U.S. Cl.
CPC .......... *G09G 3/005* (2013.01); *H04M 1/0254* (2013.01)

(58) Field of Classification Search
CPC .............................. G09G 3/005; H04M 1/0254
See application file for complete search history.

(56) References Cited

U.S. PATENT DOCUMENTS

| 6,575,585 B2 | 6/2003 | Nelson et al. |
| 2004/0102223 A1 | 5/2004 | Lo et al. |
| 2004/0105256 A1 | 6/2004 | Jones |

FOREIGN PATENT DOCUMENTS

| CN | 204089226 U | 1/2015 |
| CN | 204511932 U | 7/2015 |
| CN | 204783761 U | 11/2015 |
| CN | 205805964 | * 12/2016 |

OTHER PUBLICATIONS

Glyka BG, Send Your Message With a Cooling Fan, Sep. 4, 2015, 5 pages.*

* cited by examiner

*Primary Examiner* — Nitin Patel
(74) *Attorney, Agent, or Firm* — McHale & Slavin, P.A.

(57) ABSTRACT

Disclosed is a device that attaches to a smart phone to provide a portable fan and text display. Using either an iOS or OTG (Android) connection, fan blades are powered by the smart phone connection, providing a cooling breeze that can directed toward an individual. In addition, LEDs are mounted on one of the fan blades and are synchronized to illuminate during fan blade rotation to provide persistence of vision, wherein text images are readable by the human eye. Text messages can be preprogrammed or, in an alternative embodiment, entered directly from the smart phone.

15 Claims, 21 Drawing Sheets

SMART PHONE FAN AND LED DISPLAY

PRIORITY CLAIM

In accordance with 37 C.F.R. § 1.76, a claim of priority is included in an Application Data Sheet filed concurrently herewith. Accordingly, the present invention claims priority to U.S. Provisional Patent Application No. 62/444,108, entitled "SMART PHONE FAN AND LED DISPLAY", filed Jan. 9, 2017. The contents of which the above-referenced application is incorporated herein by reference in its entirety.

FIELD OF THE INVENTION

This invention relates generally to portable fans, and more specifically, to a portable phone fan capable of displaying text messages.

BACKGROUND OF THE INVENTION

Numerous systems for producing visual text images are known in the industry. One such technology utilizes rotating assemblies having intermittently illuminated elements to produce images. The rotation of an element, combined with changing illuminated segments, produces flashing frames that the eye interprets as an image. This effect is known as persistence of vision, which can be used to synchronize individual illuminating lights at specific positions during the rotation of the element.

U.S. Publication No. 2004/0102223 discloses a rotating LED device that displays data by synchronizing the illumination display of a row of rotating LEDs.

U.S. Pat. No. 6,575,585 discloses a battery operated amusement device that spins an array of lights. A small control circuit is located on the rotating member which contains predetermined embedded ornamental patterns that cause the light array to illuminate in a predetermined pattern, synchronous to their speed. This causes an ornamental lighted display of shapes, colors, images or text to appear, depending on the predetermined pattern data integral to the control circuit.

U.S. Publication No. 2004/0105256 discloses generating windmills, decorative spinners, and ornamental devices powered by solar or wind energy. In operation, as the windmill turns, sets of small LEDs scan rotational patterns of light, creating an ornamental effect.

CN204089226U translation discloses a fan with USB charger, and has a support that is mounted in the fan main structure to which the battery box is provided, and indicating lamp support frame that is set with the indicating lamp.

CN204511932(U) translation discloses a superminiature USB electric fan, including base, motor, fan head, flabellum, connection shaft, USB interface, A motor contact, B motor contact, A base contact, B base contact and wire. The base right side is equipped with USB interface, the motor is connected with the base through a connected shaft, the overhead flabellum that is equipped with the fan is connected to the shaft and the fan head of the motor. The motor is equipped with A motor contact and B motor contact, wherein the wire and A base contact are passed through to A motor contact, and B motor contact is through a wire and B base contact connection. The base top is located to A base contact and B base contact. The superminiature USB electric fan is supplied power such as from the "external treasured" [sic] that charges accessible USB interface, and this product is equipped with a battery inside, and goes back to accessible USB interface and supplies power to other electrical apparatus, and the function is various. This product is small and light, the function is various, the controllability is strong, and greatly facilitates people's daily life.

CN204783761(U) translation "discloses a mini USB fan of multi-functional rotation, rotate the casing under and including last rotation casing on rotate and be equipped with the assembly chamber in the casing, the assembly intracavity is equipped with the motor, the motor is connected with the fan flabellum, on rotate the casing and rotate the casing under with through pivot swing joint the connecter that is connected with compatible USE and cell-phone on the casing and connects rotates down, the connector is connected with the motor electricity. The utility model discloses a fan inserts the mobile device, insert the motionless condition of end under, the fan rotates 180 degrees according to about the plastic housing center (left and right sides). Can be used for the mobile device square with fan work in the other direction, make things convenient for the mobile device can the front reverse side compatible, the compatibility of frequent plug or reduction equipment and single face, specifically the utility model discloses a neotype connector can compatible USB and the connector that connects of cell-phone, and the practicality is stronger."

Scanning technology is also known as "propeller clocks" comprised of a rotating LED array that spin, much like an airplane propeller. Most of these devices take the form of a rotating array of LEDs, a motor system to power the rotation, a system of delivering power to the motor and rotating LEDs, and a system to synchronously energize the LEDs, thus allowing the rotating array to visually display one or more desirable patterns.

While the prior art devices are capable of providing relatively simple displays, none of the prior art devices are capable of providing a portable fan operated by a smart phone and a means for programming directly from the smart phone.

SUMMARY

The present invention is a device that attaches to a smart phone to provide a portable fan and text display. In a preferred embodiment, the device attaches to a smart phone having either an iOS (Apple) or USB-OTG (Android) connection. The fan blades are powered by the smart phone connection, providing a cooling breeze that can directed toward an individual. A pivot mount allows the smart phone to be placed in various positions. LEDs are mounted on one of the fan blades and are synchronized to illuminate during fan blade rotation to provide persistence of vision, wherein text images are readable by the human eye. The motor used for the fan blades is a high efficient, low current drawn motor so as not to cause a significant power drain on the smart phone battery.

The text messages can be preprogrammed by a computer, or in an alternative embodiment, programmed directly from the smart phone. For instance, the smart phone operator may write their own text for display by the fan blades, or the operator may upload characters to display, such as Emojis. The smart phone connection, either directly or wirelessly, allows the transfer of text images for purposes of displaying on the rotatable fan blade assembly by feeding a controller that operates the LEDs. The LEDs are synchronized to light-up specific elements of the assembly at specific times and/or positions during rotation. The synchronized lights then display the predetermined text, or character, that is pre-loaded, programmed, or otherwise provided to the LEDs.

Accordingly, it is an objective of the instant invention to provide a portable fan and display apparatus for use with smart phones.

It is a further objective of the instant invention to provide a display apparatus having the capability of using either preprogrammed text messages or text messages created on the smart phone.

It is yet another objective of the instant invention to provide a rotational display and fan drawing minimal current, yet capable of moving a large volume of air sufficient to provide a cooling effect.

Still another objective of the instant invention is to provide a display device that can be used to display smart phone emojis.

Other objects and advantages of this invention will become apparent from the following description taken in conjunction with any accompanying drawings wherein are set forth, by way of illustration and example, certain embodiments of this invention. Any drawings contained herein constitute a part of this specification and include exemplary embodiments of the present invention and illustrate various objects and features thereof.

DETAILED DESCRIPTION OF THE PREFERRED EMBODIMENT

Figure 1:
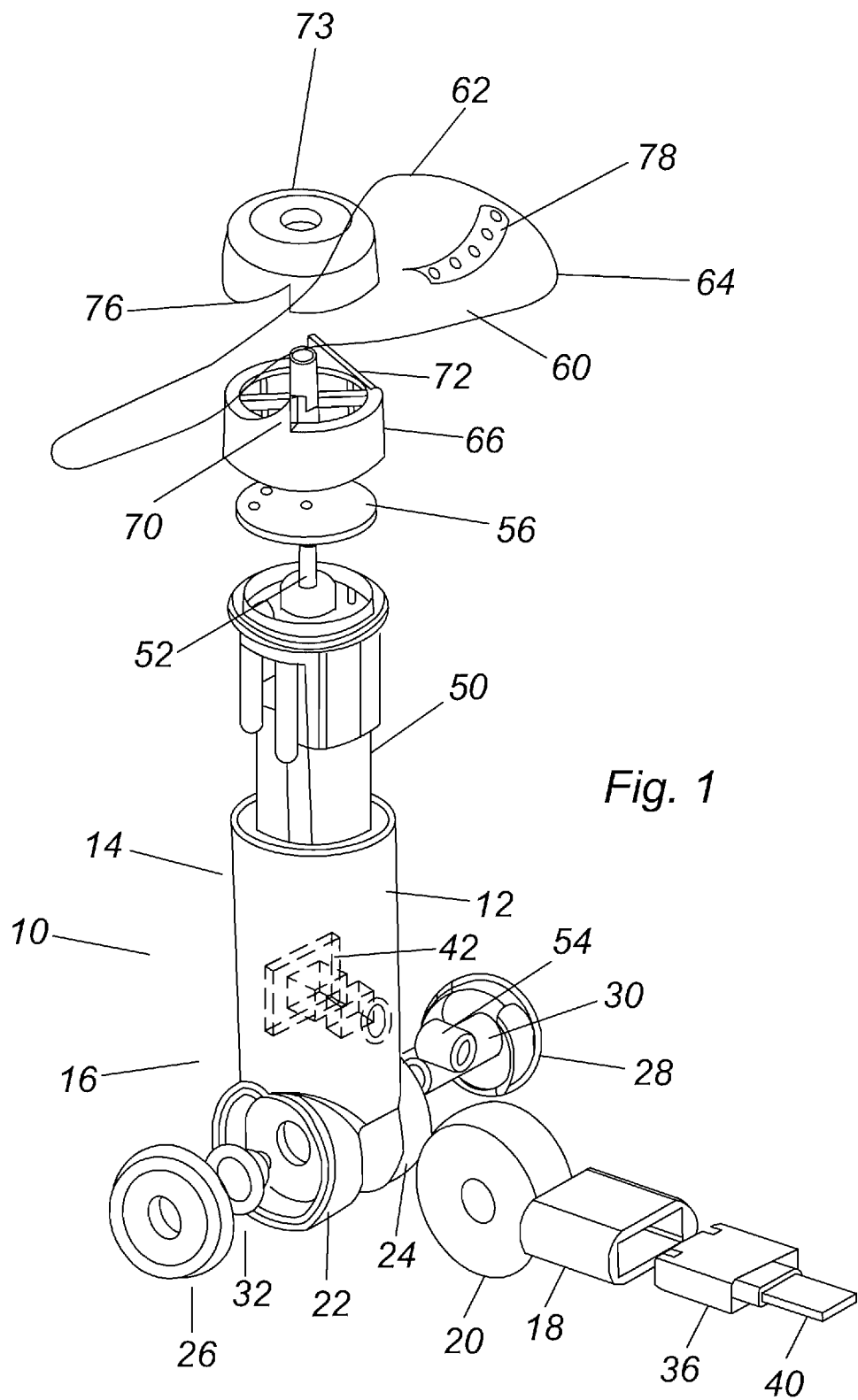
FIG. 1 is an exploded view of one embodiment of the instant invention.
Figure 2:
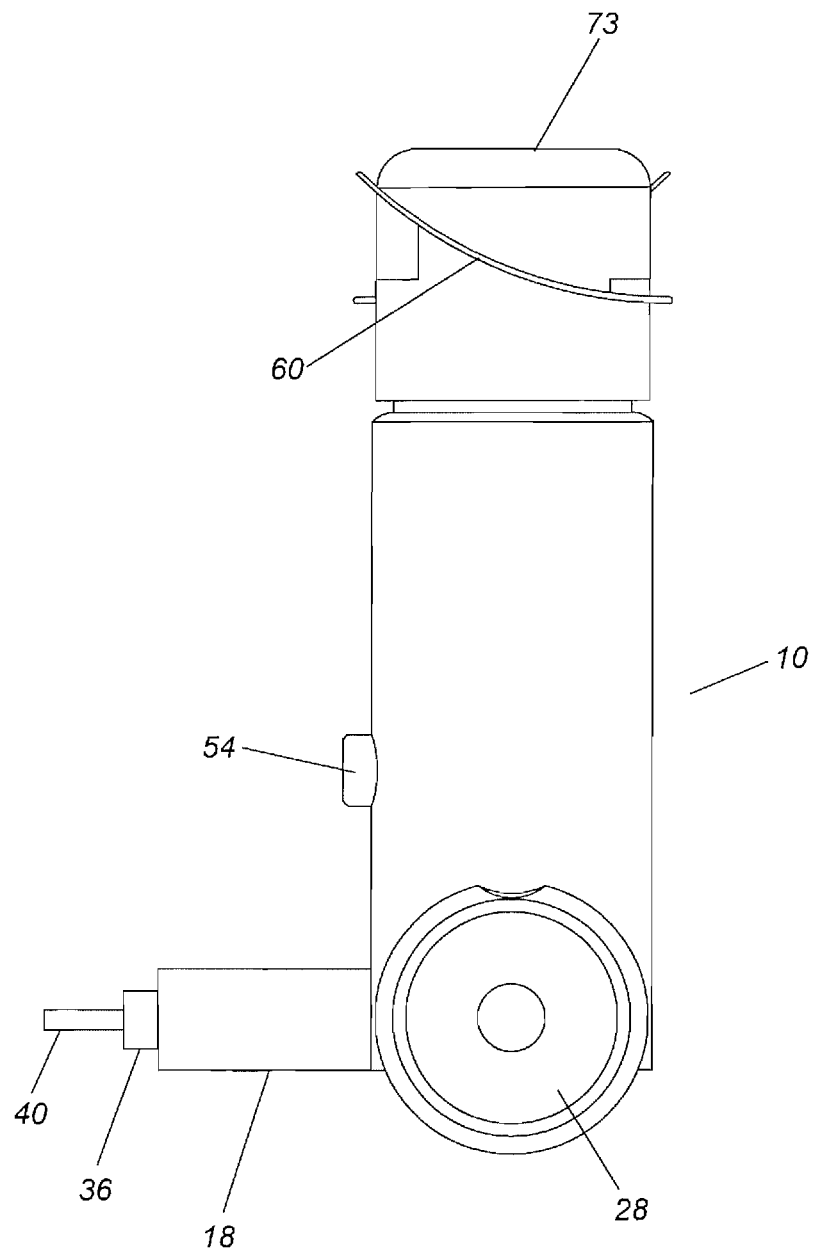
FIG. 2 is a left-side view of the embodiment in FIG. 1.
Figure 3:
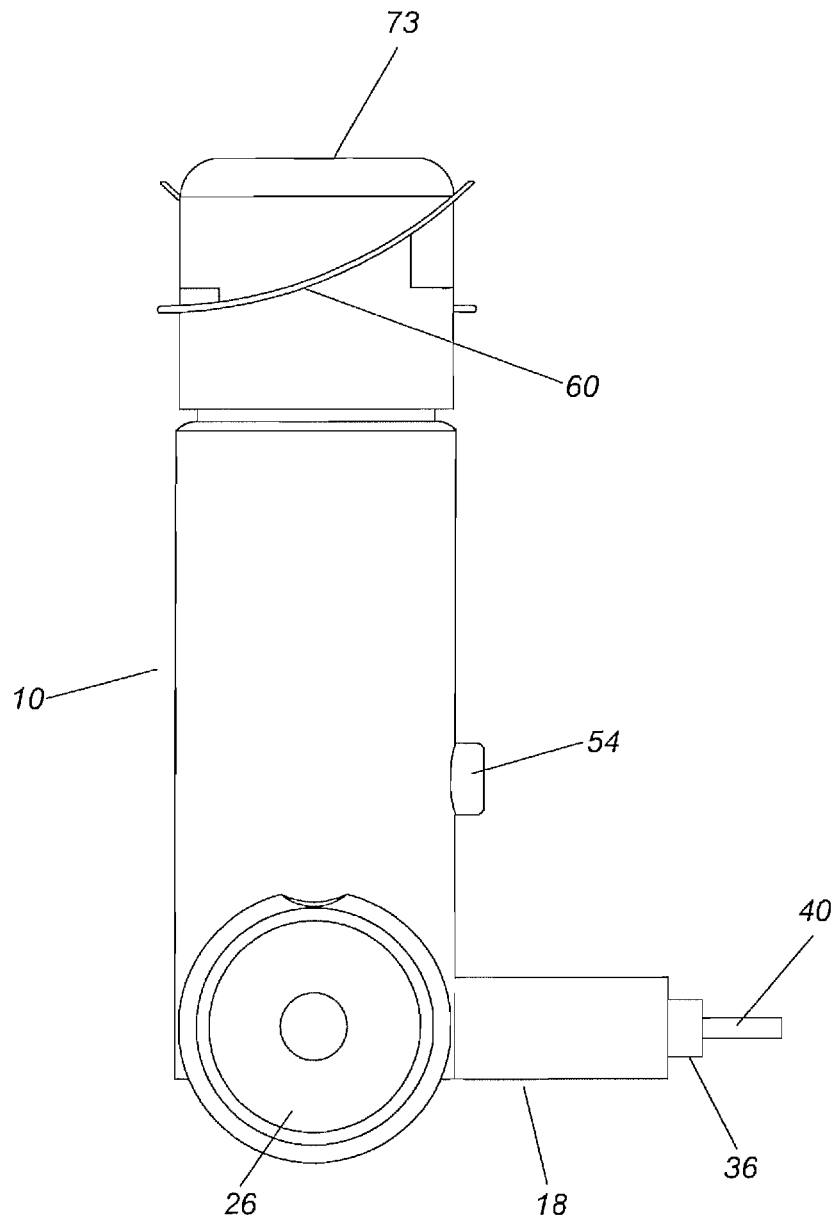
FIG. 3 is a front view of the embodiment in FIG. 1.
Figure 4:
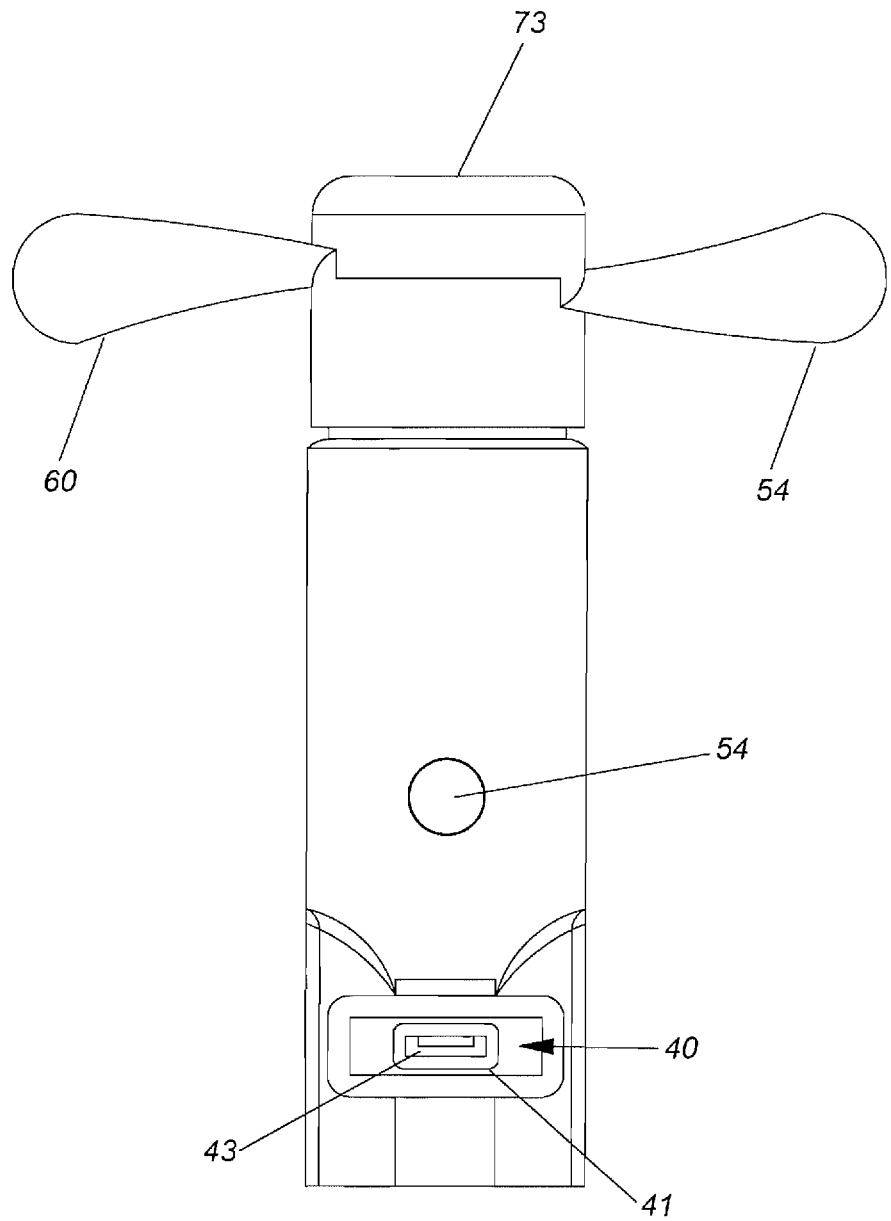
FIG. 4 is a right-side view of the embodiment of FIG. 1.
Figure 5:
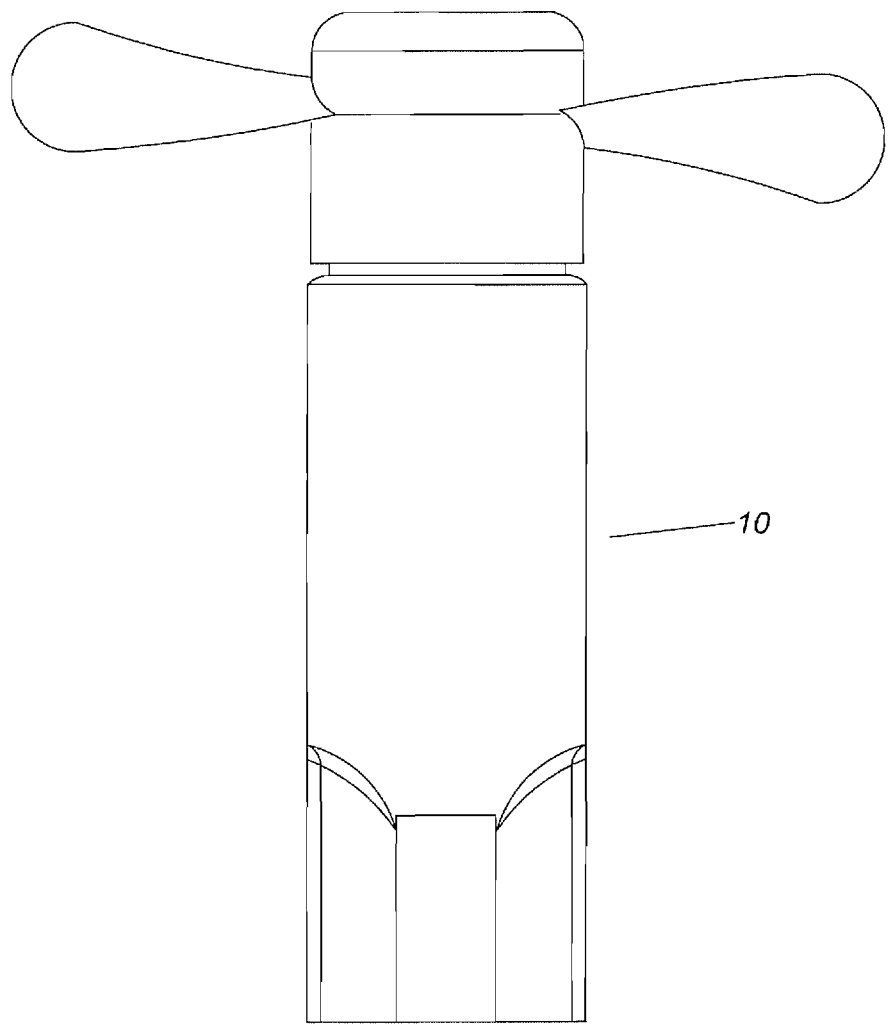
FIG. 5 is a rear view of the embodiment of FIG. 1.
Figure 6:
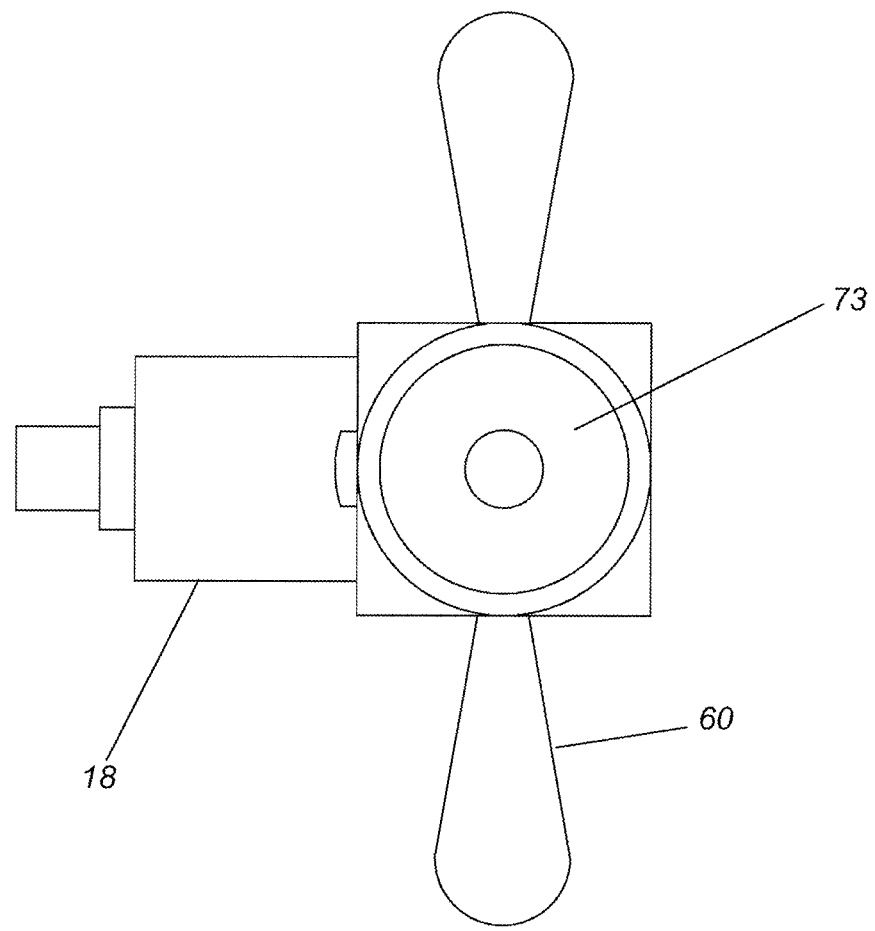
FIG. 6 is a top view of the embodiment of FIG. 1.
Figure 7:
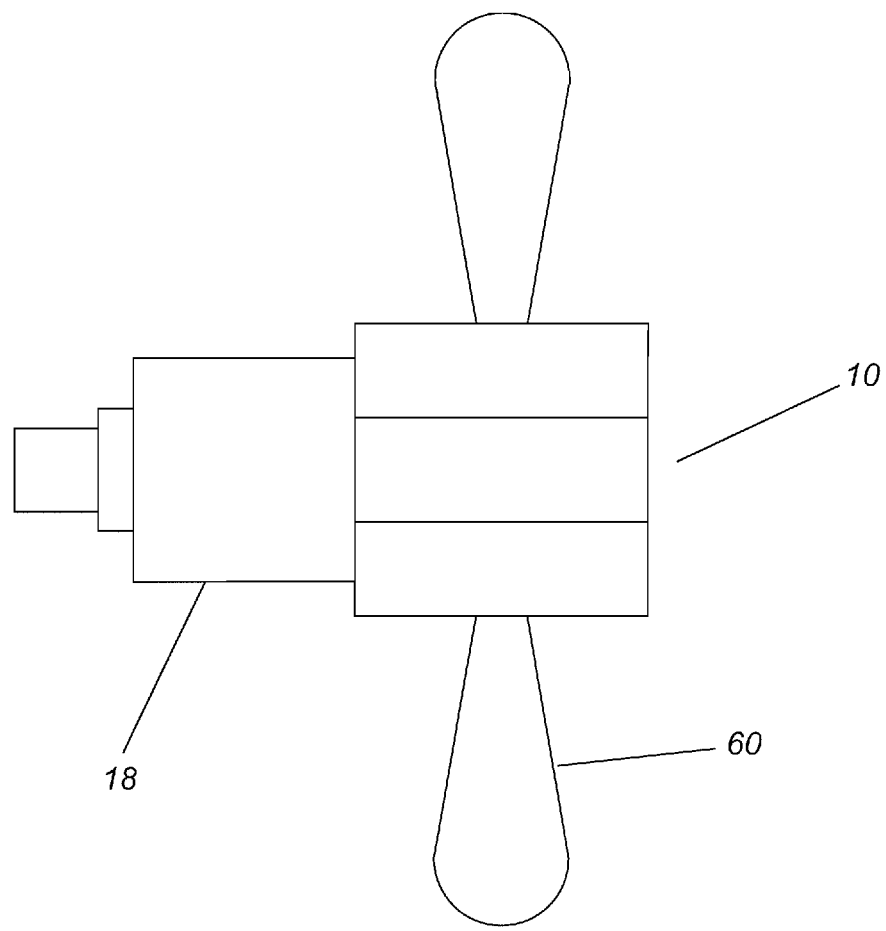
FIG. 7 is a bottom view of the embodiment of FIG. 1.
Figure 8:
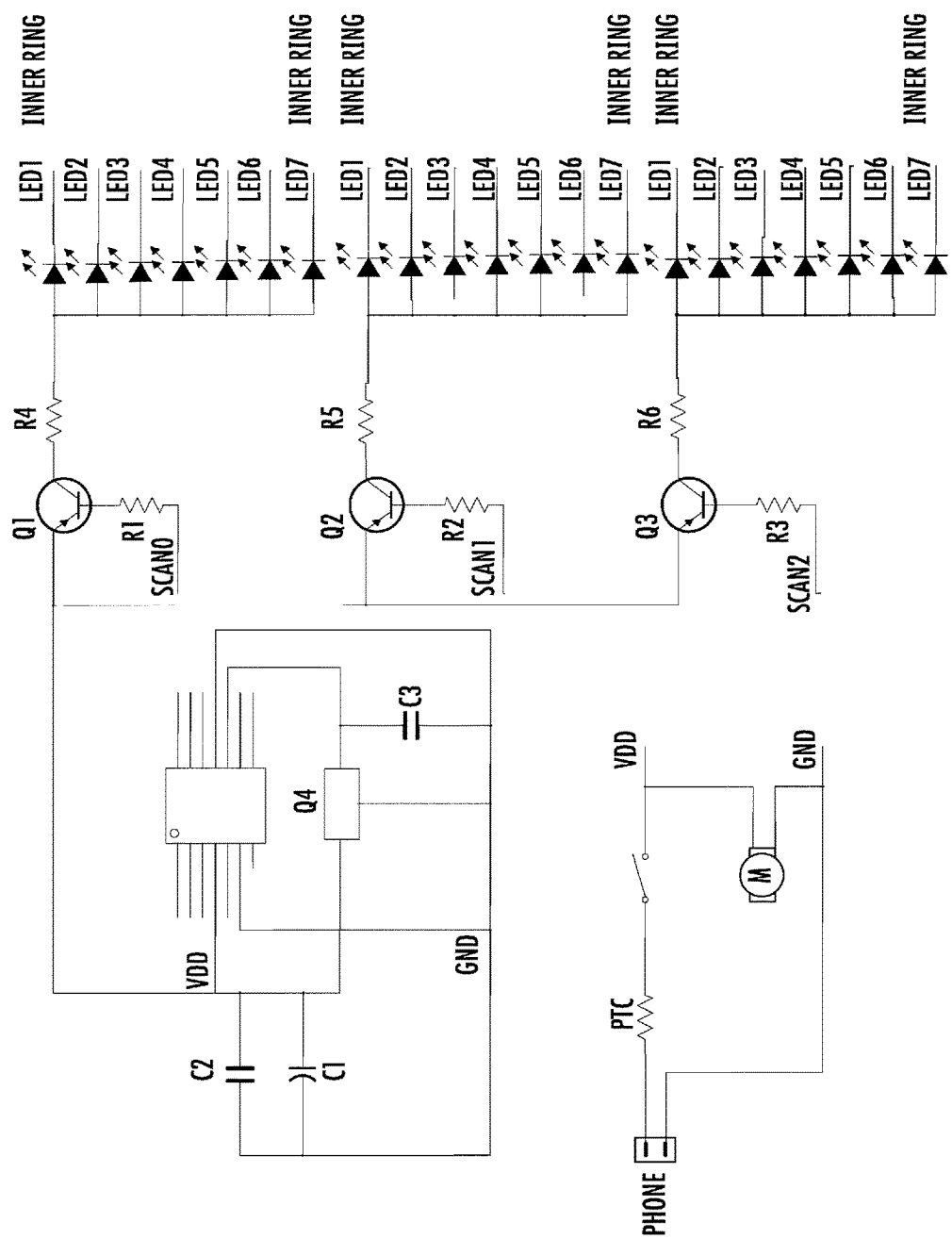
FIG. 8 is an electrical schematic of the LED circuit.
Figure 9:
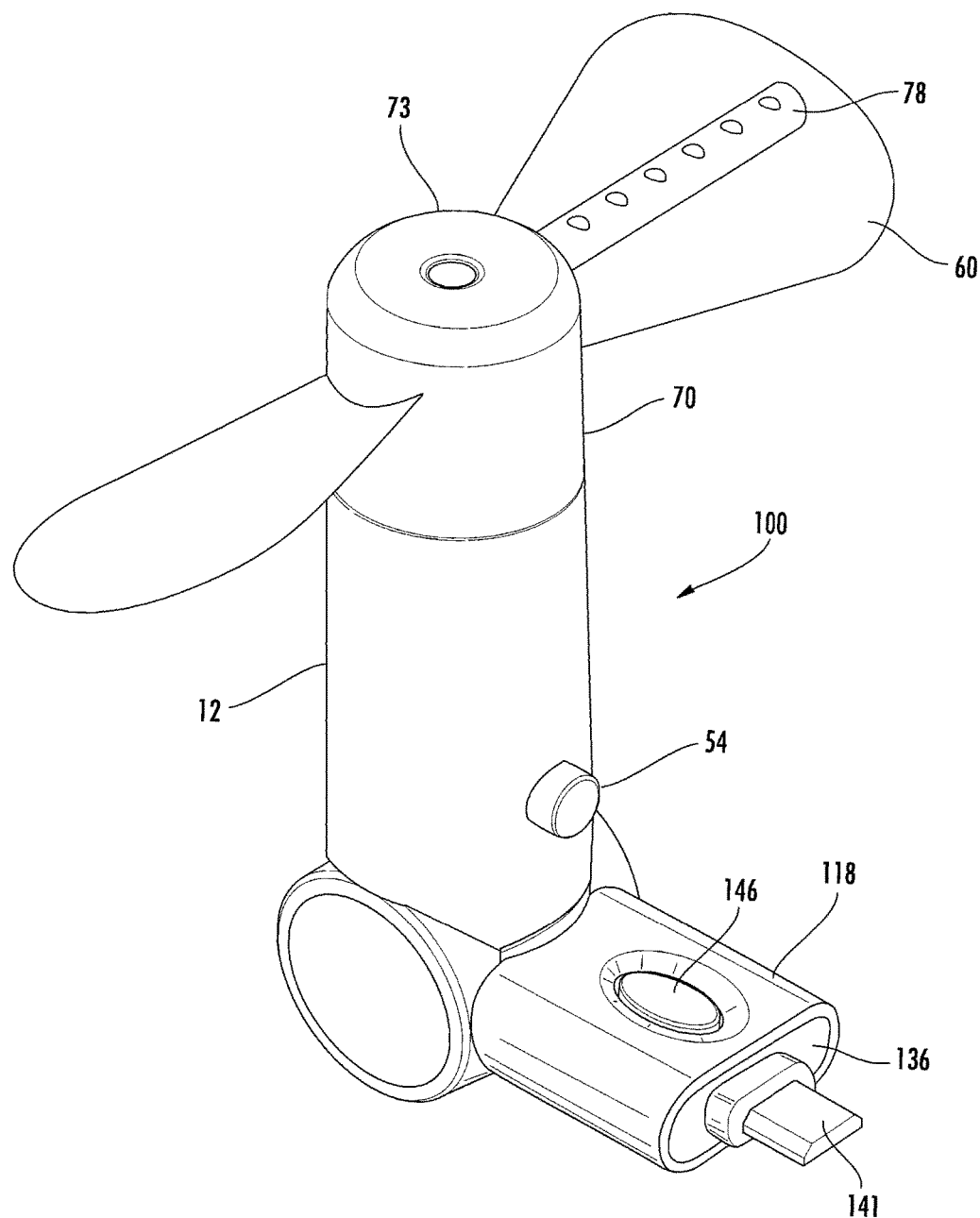
FIG. 9 is a perspective view of an alternate embodiment with 2-in-1 connector terminal.
Figure 10:
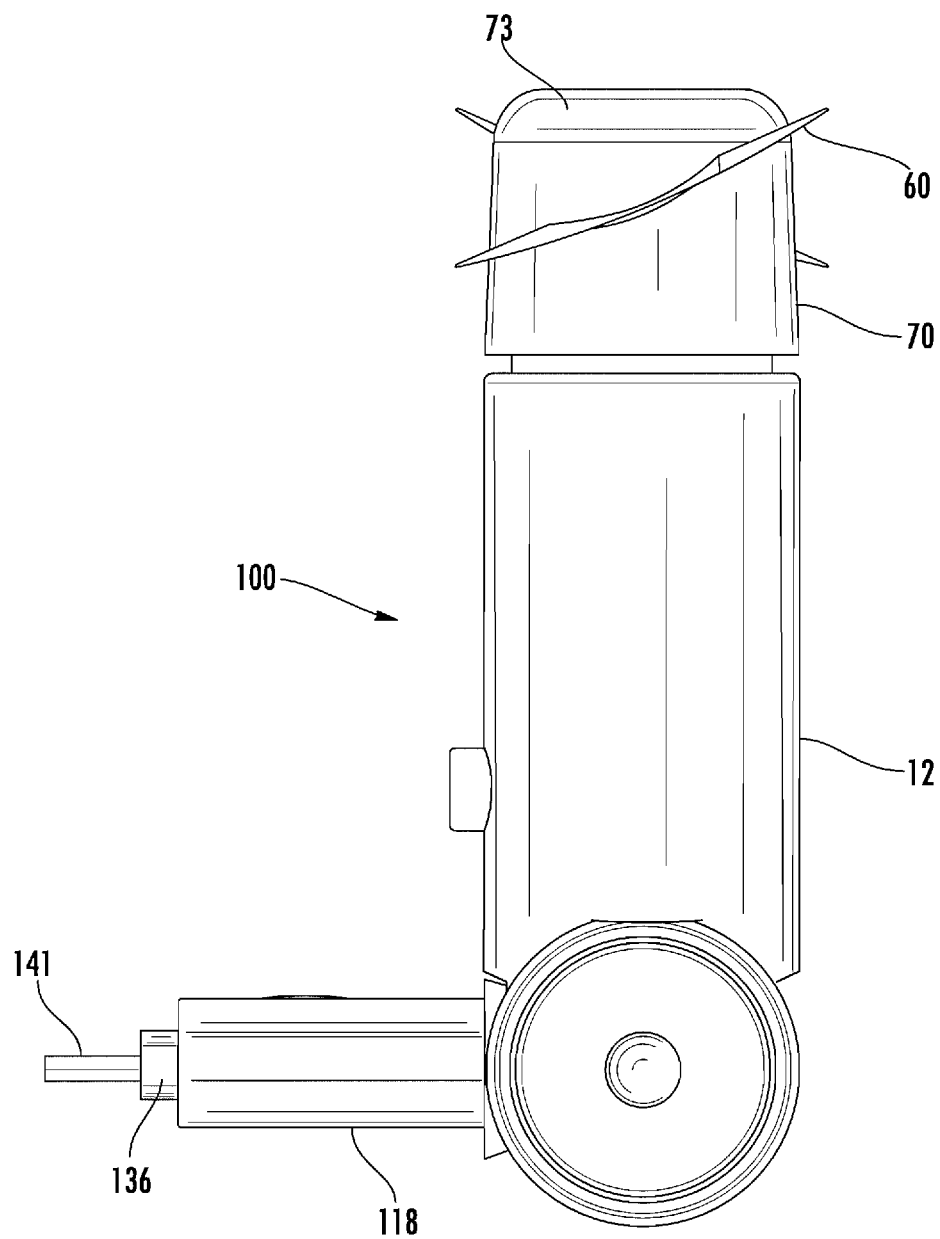
FIG. 10 is a left-side view of the alternate embodiment shown in FIG. 9.
Figure 11:
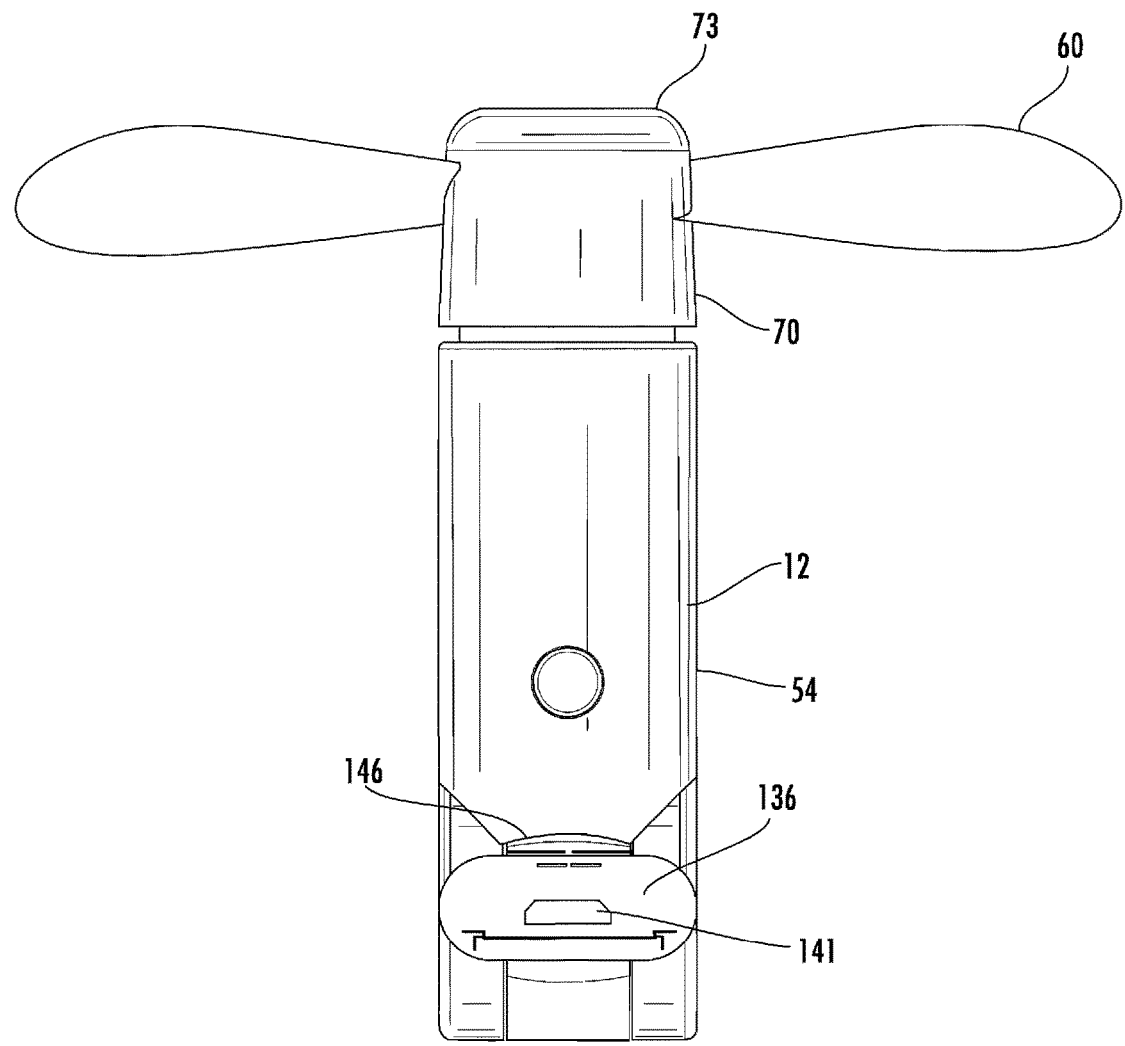
FIG. 11 is a front view of the alternate embodiment shown in FIG. 9.
Figure 12:
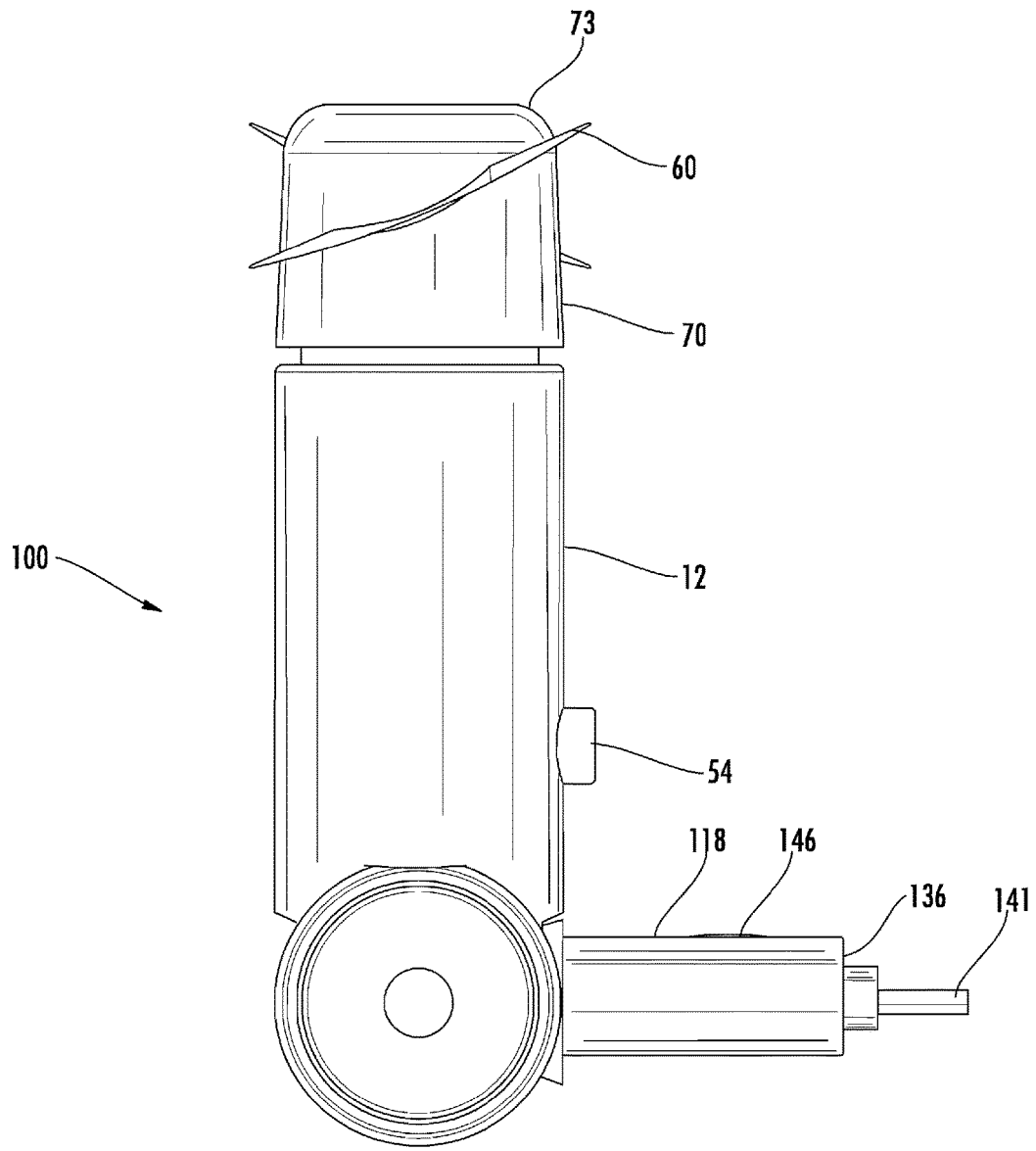
FIG. 12 is a right-side view of the alternate embodiment shown in FIG. 9.
Figure 13:
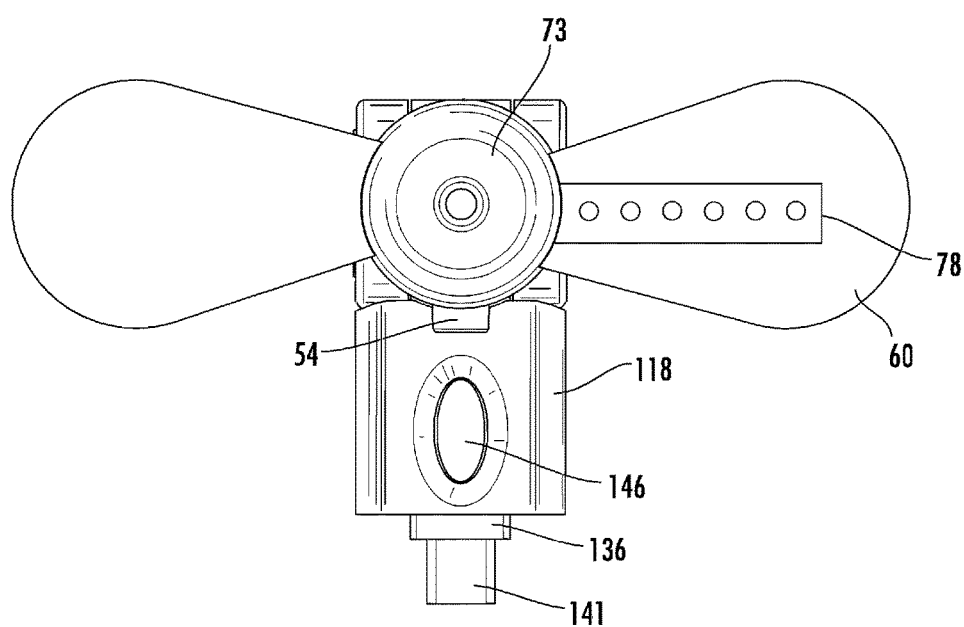
FIG. 13 is a top view of the alternate embodiment shown in FIG. 9.
Figure 14:
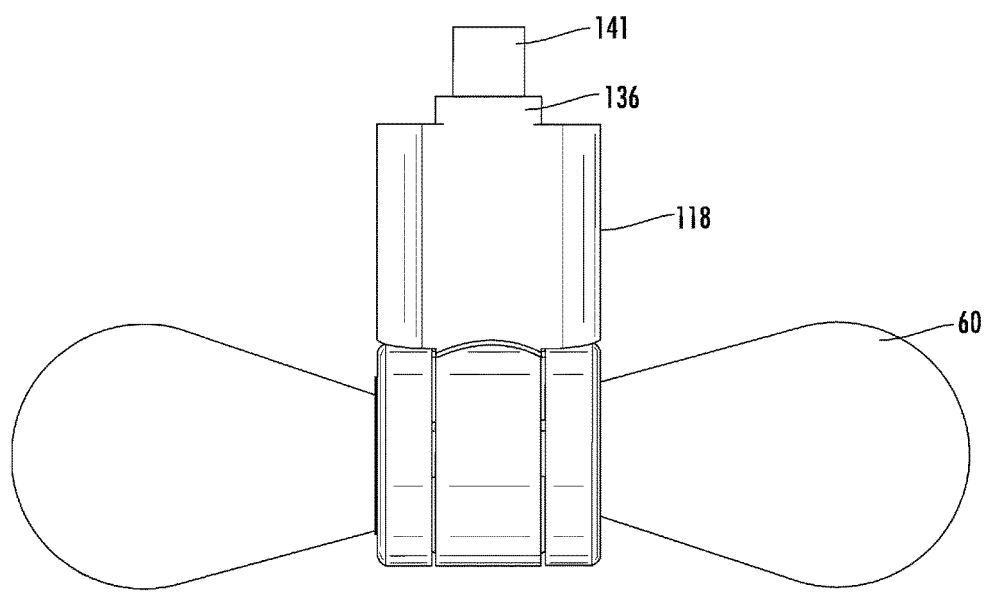
FIG. 14 is a bottom view of the alternate embodiment shown in FIG. 9.
Figure 15:
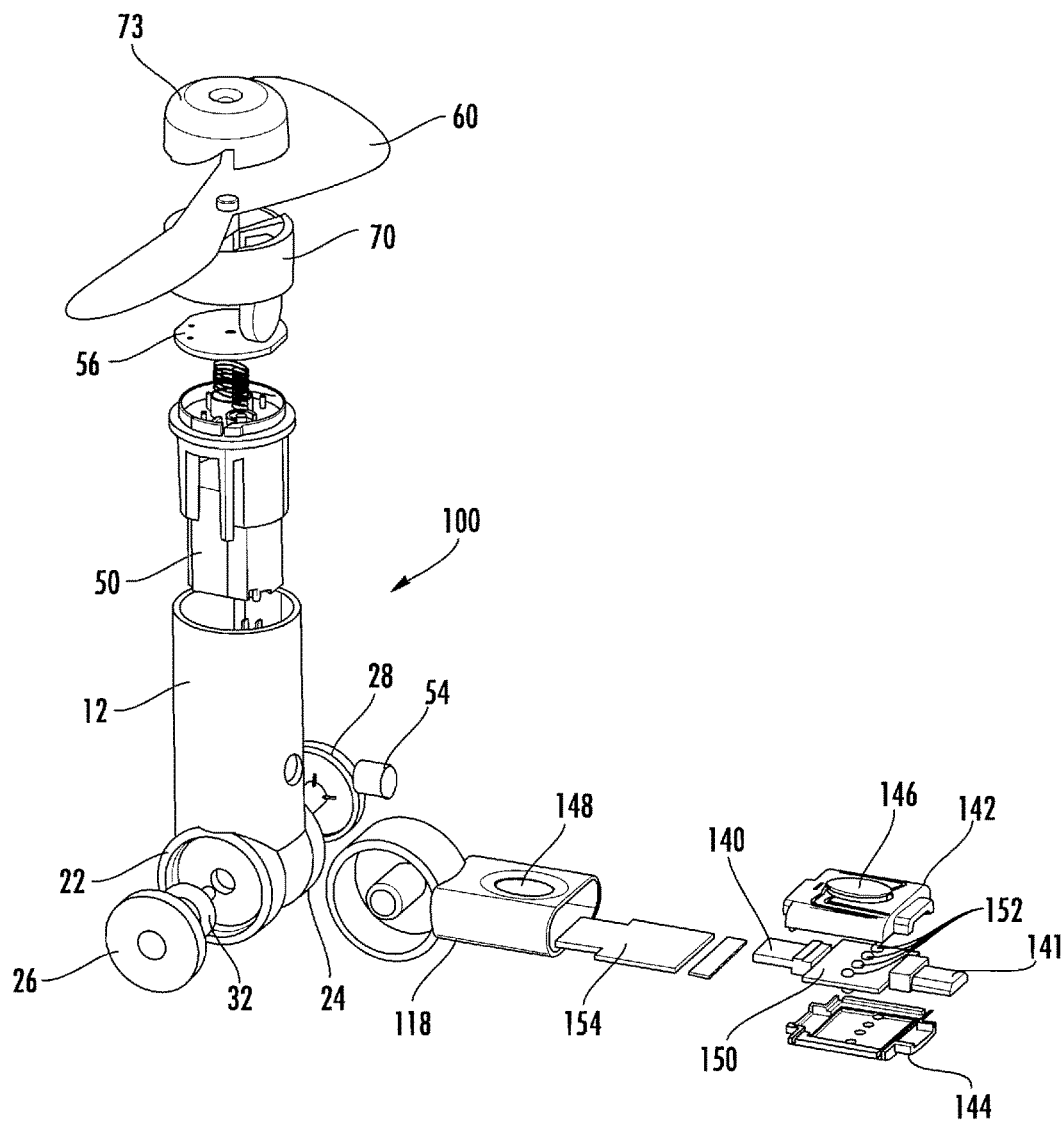
FIG. 15 is an exploded view of the alternate embodiment shown in FIG. 9.
Figure 16:
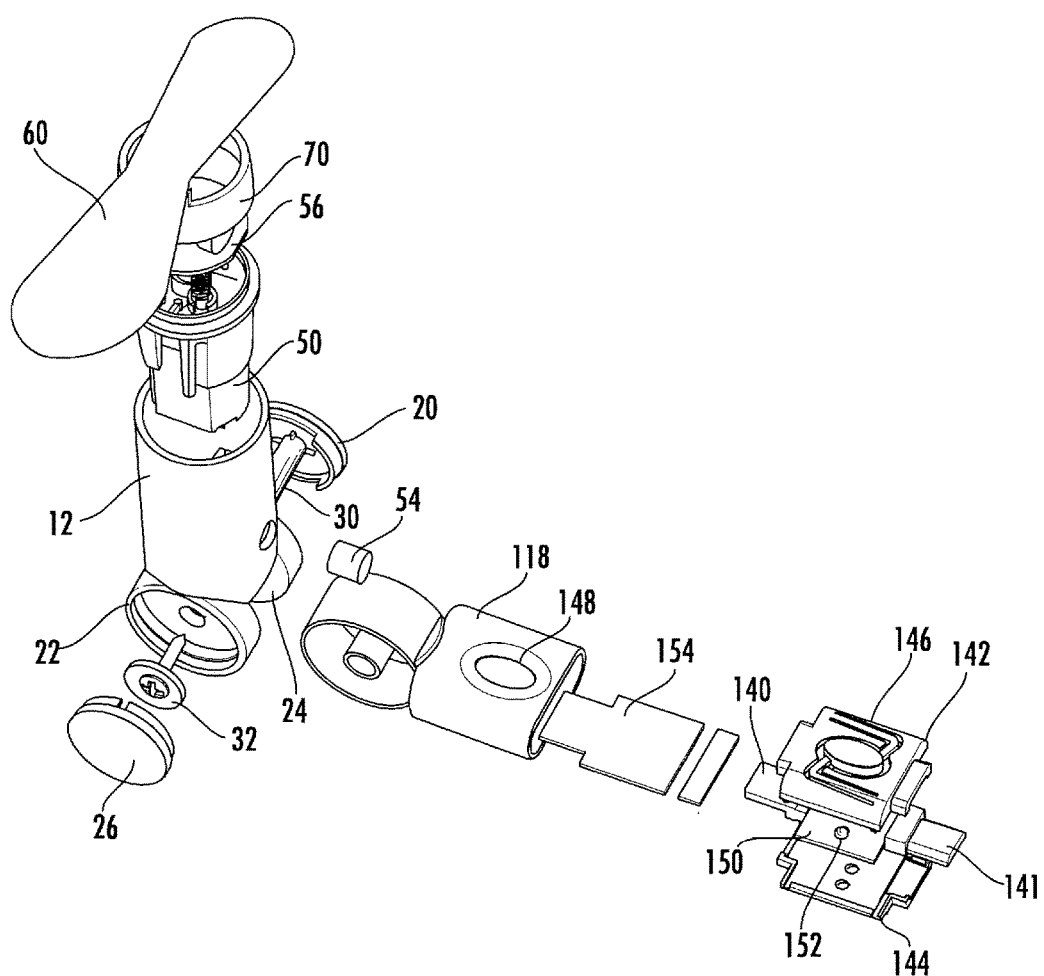
FIG. 16 is an alternate exploded view of the alternate embodiment shown in FIG. 9.
Figure 17:
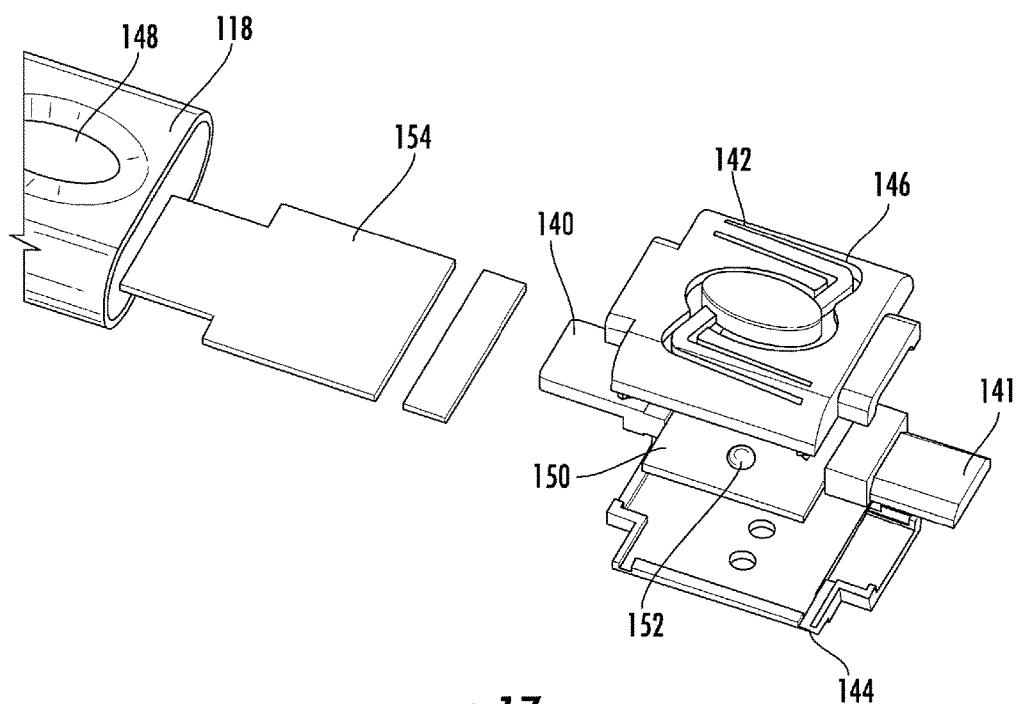
FIG. 17 is a close up view of the 2-in-1 terminal adapter shown in FIG. 16.

While the present invention is susceptible of embodiment in various forms, there is shown in the drawings and will hereinafter be described a presently preferred embodiment with the understanding that the present disclosure is to be considered an exemplification of the invention and is not intended to limit the invention to the specific embodiments illustrated.

Referring now to FIGS. 1-8, set forth is a smart phone fan and LED display device 10 comprising a housing 12, having an upper section 14 and a lower section 16. A base 18 is rotatably coupled to the lower section 16 and allows rotation of the base in relation to the housing 12 from a forward to rearward position, approximately 180 degrees.

The base 18 includes a centrally disposed wheel knob 20 positioned between spaced apart support knobs 22 and 24. A right trim 26 cover and a left trim 28 cover secures the wheel knob 20 along axle 30, which allows manual rotation of the housing 12 in relation to the base 18. Attachment screw 32 further secures the axle 30 in position to prevent disengagement, and can be used to cause a frictional engagement of the knobs, so that the housing 12 and base 18 will stay in a position upon rotation. This allows the device to be attached to a phone that is laying on a table, and permit the housing to be placed at an angle to allow the fan blades to freely rotate, wherein the smart phone operates as a stand and power supply.

The base 18 includes a terminal adapter 36 and a terminal 40. The terminal is electrically coupled to the switchboard 42, although in an alternate embodiment the terminal adapter 36 and the switchboard 42 could be wirelessly coupled. The terminal 40 is either an iOS or USB-OTG terminal, and may be interchanged so that the device would work on either an Apple-type or Android-type smart phone. In the embodiment shown in FIGS. 1-7, the device is provided with either a USB-OTG terminal or an iOS terminal. An adapter (not shown) can be utilized to convert from a USB-OTG terminal to a iOS terminal. The terminal 40 can be inserted into a corresponding phone receptacle in either a forward or rearward position.

The motor 50 used for rotation of the fan blades 60 is insertable into the upper section 14 of the housing 12, leaving rotation shaft 52 extending out of the housing 12 for connection to the fan blade 60. Power to the motor 50 is received through the terminal 40 which is electrically coupled to the switchboard 42. Alternatively, the low current draw from the motor 50 allows the base 18 to transfer the necessary current through the wall of the knob 20.

The switch 54 provides an on/off operation between the terminal 40 and the motor 50. A circuit wafer 56, positioned over the motor 50, contains preprogrammed text messages to be delivered through the LEDs 78. The shaft 52 is coupled to a leaf fan blade 60. The leaf fan blade 60 has a raised trailing edge 62 and inward positioned leading edge 64, wherein rotation of the fan blade 60 causes a displacement of air and a cooling effect when directed toward an individual. The fan blade 60 has a bottom cover 66 with ramps 70 and 72 to cause the leading edge 64 and trailing edge 62 of the fan blade 60 to be placed at a curved position.

The top cover of the blade 73 includes reciprocal ramps 76 so as to maintain the blade 60 in the curved position. The blade 60 is preferably made out of a flexible plastic, which allows non-marring of surfaces and individuals should either be impacted while the blade 60 is rotating. One of the blades includes LEDs 78, which are coupled to the circuit wafer 56 and programmed with text messages, making the device 10 ideal for promotional displays.

Alternatively, the text messages can be entered by the operator of the smart phone that the device 10 is attached to, wherein the text messages can be customized by the individual operator while the device 10 is in use. Further, the operator may simply upload certain images, such as emojis. Unique to this device 10 is the ability for the terminal 40 to be designed for connection to a smart phone using either an iOS or USB-OTG charging receptacle, wherein power can be drawn from the smart phone battery for use in powering the fan and display mechanism. In programming the display message, a user will be able to select the position and orientation of the message relative to the circle drawn by the spinning fan blades.

It should be noted that the motor 50 is rotating a lightweight plastic band at a relatively slow speed, and the efficiency of the motor 50 causes a negligible effect on the battery life of the smart phone.

In addition, as previously mentioned, as opposed to programming the text images to display using the smart phone powering the device 10, the power and text images can also be applied remotely. This can be used in the case where the device 10 is used in a promotional aspect, where security is needed for entering of text messages. The text messages can be programmed remotely or at the operator's site using a computer attached to the Internet. In this embodiment, the text signals are preferably forwarded wirelessly, but can also be forwarded through electrically coupling the device 10 to the computer.

A smart phone app is available from the Applicant that allows the operator of the smart phone to use the app for purposes of importing, manipulating, storing and selectively displaying various images that are either recognized by the public as being unique, or in many instances, where the individual feels most comfortable with the technology.

FIGS. 9-18, and 23 show an alternate embodiment of the device 100, whereby the terminal adapter 136 can be removed and reversed to provide either iOS or USB-OTG terminals 140,141. In this embodiment, the terminal adapter 136 is convertible, wherein positioning the adapter 136 in a first orientation allows terminal 140 to attach to an iOS receptacle, and positioning the adapter 136 in a second orientation allows terminal 141 to attach to a USB-OTG receptacle. Changing the orientation of the terminal adapter 136 in relation to the base 118 allows for ease of adaption to either type of smart phone receptacle.

In this embodiment, the adapter 136 includes a two-part housing with an upper piece 142 and a lower piece 144. On the upper housing piece 142 there is a button 146 which engages with an opening 148 in the base 118 to maintain the position of the terminal adapter 136 within the base 118.

Figure 18:
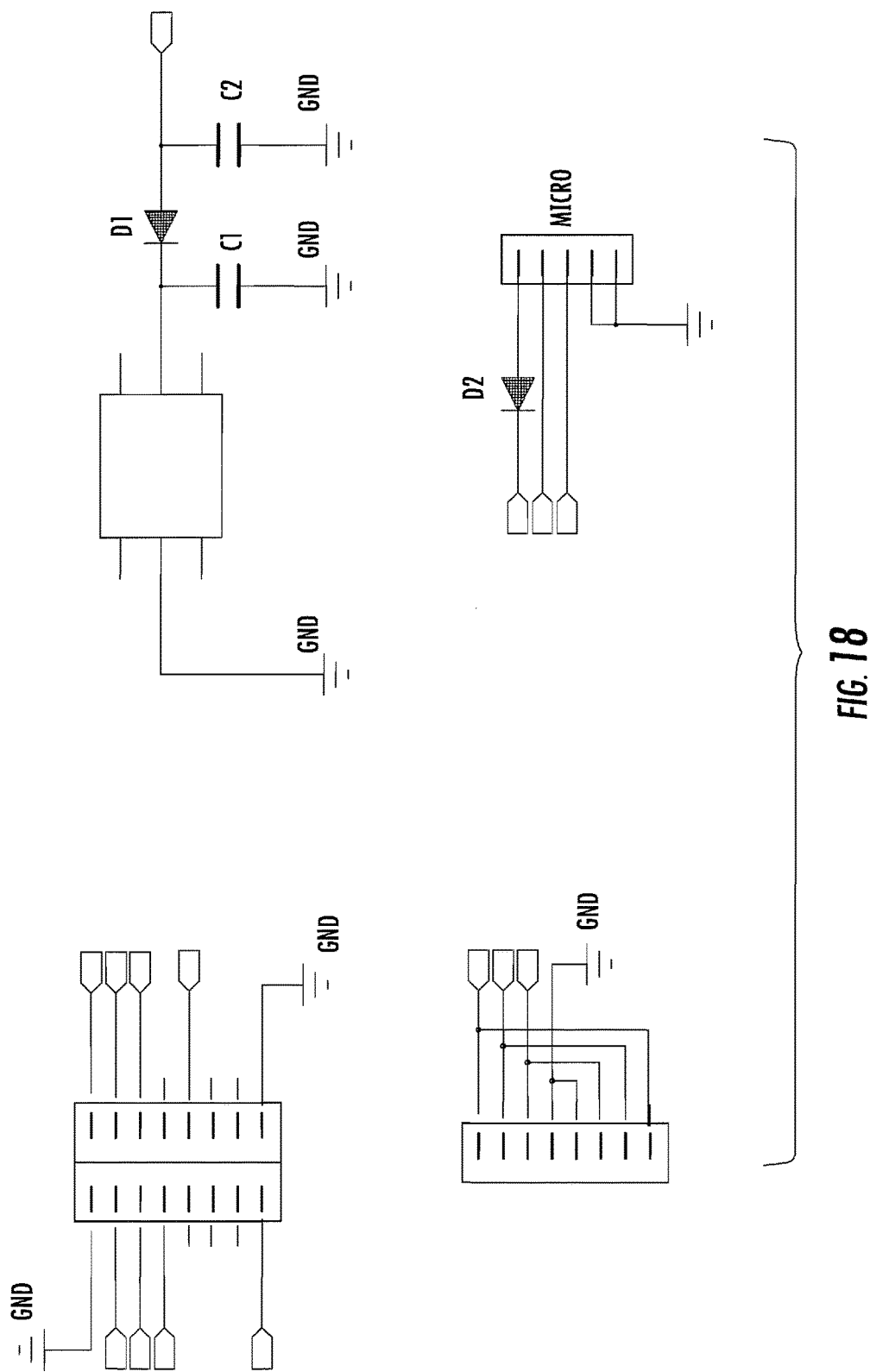
FIG. 18 is an electrical schematic of the 2-in-1 connector.
Figure 19:
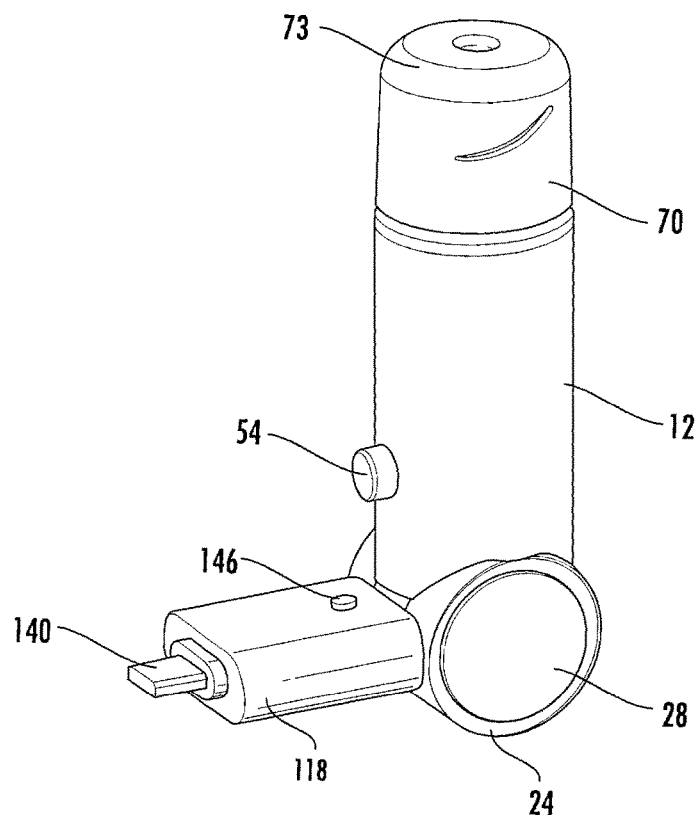
FIG. 19 is a perspective view of an alternate embodiment of the device with 2-in-1 connector, with the connector attached.
Figure 20:
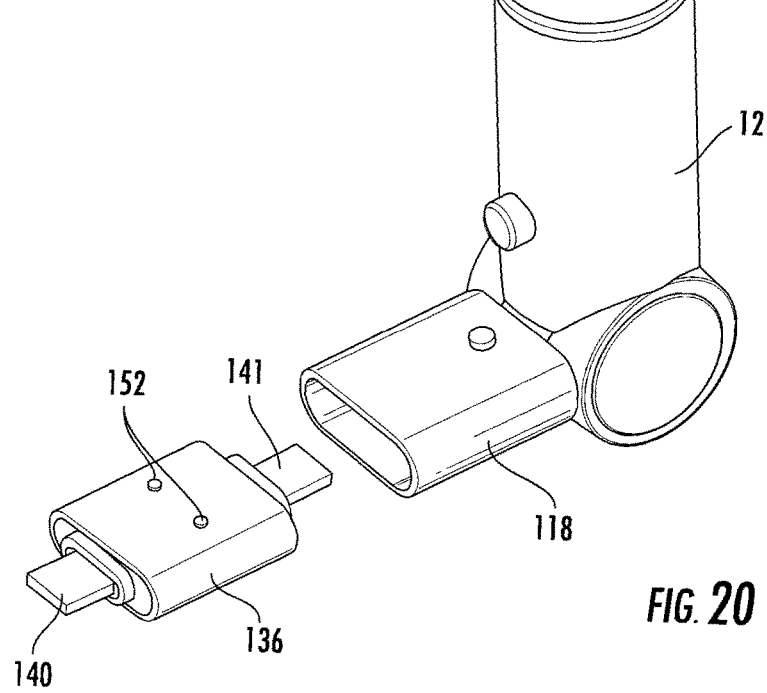
FIG. 20 is a perspective view of the alternate embodiment shown in FIG. 19, with the 2-in-1 connector removed.
Figure 21:
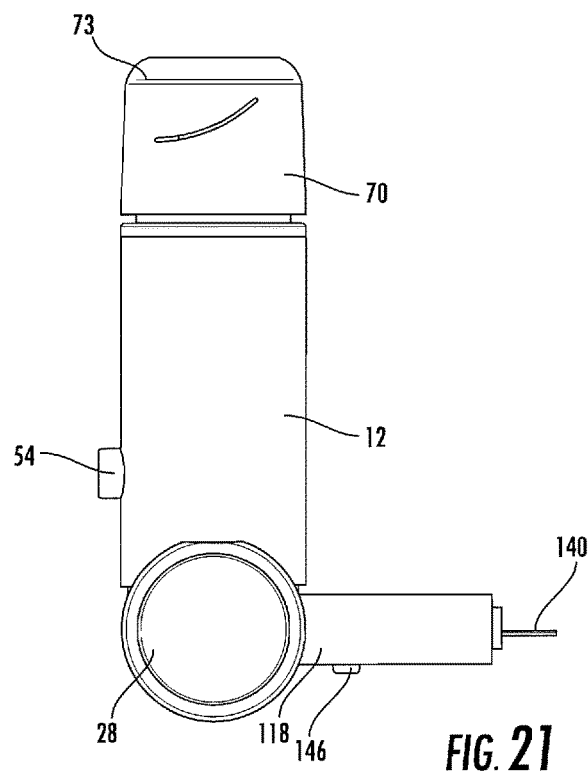
FIG. 21 is a left-side view of the alternate embodiment of FIG. 19 shown with the base in a reversed position, and the 2-in-1 connector attached.
Figure 22:
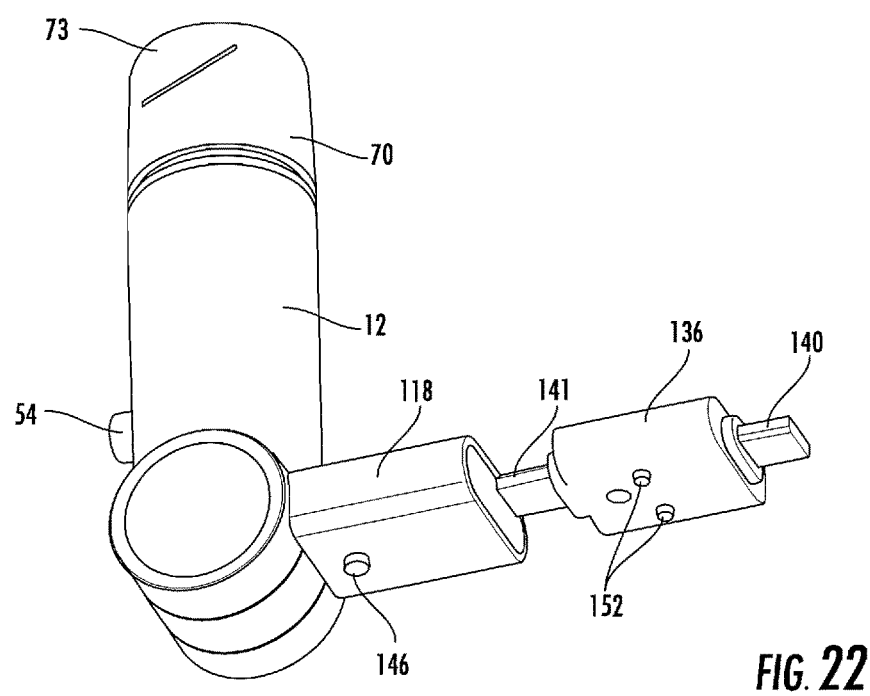
FIG. 22 is a perspective view of the alternate embodiment of FIG. 19 shown with the 2-in-1 connector removed.

The upper and lower housing pieces 142,144 are disposed around a central terminal member 150. The iOS terminal 140 is on a first end of the central terminal member 150, and the USB-OTG terminal 141 is on the second end of the central terminal member 150. The central terminal member also has a plurality of contacts 152 so that when the terminal adapter 136 is disposed within the base 118, the contacts 152 provide electrical contact with a terminal circuit board 154. The terminal circuit board 154 is disposed within the base 118 and provides electrical coupling between the terminal adapter 136 and the switchboard 42. FIG. 18 shows an electrical schematic view of the 2-in-1 connector.

When the terminal adapter 136 is engaged within the base 118, a user can depress the button 146 to allow the terminal adapter 136 to slide out of the base 118. This allows the user to reverse the orientation of the terminal adapter 136. In this way, the user can adapt the device 100 for use with either an iOS-based or USB-OTG based smart phone.

Figure 23:
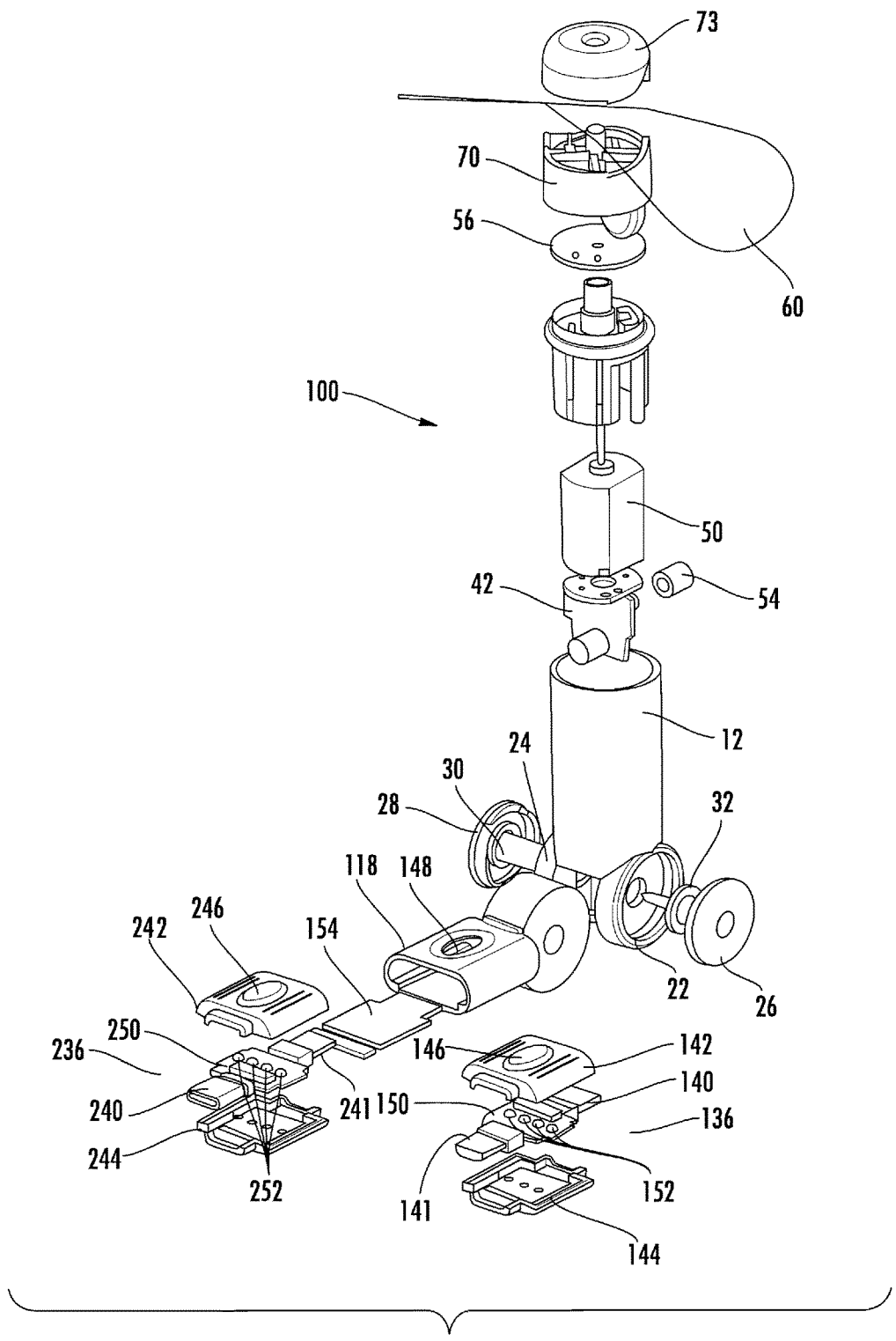
FIG. 23 is an exploded view of the alternate embodiment shown in FIG. 9, shown with alternate terminal adapters.

In FIG. 23, two different terminal adapters 136,236 are shown for use with the device 100. In addition to the terminal adapter 136, described above for use with an iOS terminal 140 and an android terminal 141, the device 100 can also be provided with a terminal adapter 236 which has both a micro-USB terminal 241 and a USB-type C terminal 242.

Terminal adapter 236 has includes a two-part housing with an upper piece 242 and a lower piece 244. On the upper housing piece 242 there is a button 246 which engages with an opening 148 in the base 118 to maintain the position of the terminal adapter 236 within the base 118.

The upper and lower housing pieces 242,244 are disposed around a central terminal member 250. The micro-USB terminal 241 is on a first end of the central terminal member 250, and the USB-Type C terminal 240 is on the second end of the central terminal member 250. The central terminal member 250 also has a plurality of contacts 252 so that when the terminal adapter 236 is disposed within the base 118, the contacts 252 provide electrical contact with a terminal circuit board 154. The terminal circuit board 154 is disposed within the base 118 and provides electrical coupling between the terminal adapter 236 and the switchboard (not shown in FIG. 23).

When the terminal adapter 236 is engaged within the base 118, a user can depress the button 246 to allow the terminal adapter 236 to slide out of the base 118. This allows the user to reverse the orientation of the terminal adapter 236. In this way, the user can adapt the device 100 for use with a smart phone using either a micro-USB connection or a USB-Type C connection.

FIGS. 19-22 show an alternate embodiment of device 100 with a 2-in-1 terminal adapter 136.

All patents and publications mentioned in this specification are indicative of the levels of those skilled in the art to which the invention pertains. It is to be understood that while certain forms of the invention are illustrated, it is not to be limited to the specific form or arrangement herein described and shown. It will be apparent to those skilled in the art that various changes may be made without departing from the scope of the invention, and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary, and are not intended as limitations on the scope. Changes therein and other uses will occur to those skilled in the art, which are encompassed within the spirit of the invention and are defined by the scope of the appended claims.

Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A smart phone fan and LED display comprising:
   a housing having a lower section and an upper section;
   a base pivotably coupled to said lower section, said base having a terminal constructed and arranged to fit within a smart phone terminal receptacle, wherein said base is pivotable from about −90 degrees to about +90 degrees, relative to a longitudinal axis of said housing, adapting said housing to be positionable relative to a smart phone;
   a motor positioned within said housing, said motor electrically coupled to said terminal and constructed to be powered from current received through said terminal when said terminal is connected to said smart phone;
   a fan assembly electrically coupled to said motor, said fan formed from at least two flexible fan blades, each having a leading edge and a trailing edge capable of moving air when rotated;
   a plurality of LEDs attached to at least one fan blade and electrically coupled to a controller;
   a smart phone app for programming said controller with a text message entered by an operator of the smart phone, wherein the smart phone operator is allowed to import, manipulate, store and selectively display an image of the operator's choice as the text image;
   wherein said text image is displayed by persistence of vision from LEDs during rotation of the fan assembly.

2. The smart phone fan and LED display according to claim 1 wherein said controller is programmed with text messages.

3. The smart phone fan and LED display according to claim 1 wherein said terminal is compatible with a smart phone iOS receptacle.

4. The smart phone fan and LED display according to claim 1 wherein said terminal is compatible with a smart phone USB-OTG Android receptacle.

5. The smart phone fan and LED display according to claim 1 wherein said base is constructed and arranged to be supported by said terminal when said terminal is coupled to said smart phone, and wherein said base is constructed and arranged to support said housing and fan display by said terminal upon connection of said terminal to said smart phone.

6. The smart phone fan and LED display according to claim 1, wherein said base further comprises a terminal adapter having a first end and a second end, said terminal located on said first end of said terminal adapter and said terminal adapter coupling said terminal to said base.

7. The smart phone fan and LED display according to claim 6, wherein said terminal adapter further includes a second terminal located on said second end of said terminal adapter.

8. The smart phone fan and LED display according to claim 7, wherein said terminal adapter further includes a central terminal member electrically coupled on a first end to said terminal and said central terminal member electrically coupled on a second end to said second terminal.

9. The smart phone fan and LED display according to claim 8, wherein said terminal is compatible with a smart phone USB-OTG Android receptacle and said second terminal is compatible with a smart phone iOS receptacle.

10. The smart phone fan and LED display according to claim 9, wherein said base further includes a circuit board, said circuit board electrically coupled to said central terminal member.

11. The smart phone fan and LED display according to claim 10, wherein said central terminal member further includes a plurality of contacts, said contacts electrically coupling said central terminal member to said circuit board.

12. The smart phone fan and LED display according to claim 1 wherein text display is emojis stored on the smart phone.

13. The smart phone fan and LED display according to claim 1 wherein text images are displayed in a plurality of different colors.

14. The smart phone fan and LED display according to claim 1 wherein text images are substantially immovable relative to the smart phone during display thereof.

15. The smart phone fan and LED display according to claim 1 wherein text images are rotating during display.

* * * * *